(12) United States Patent
Zhu

(10) Patent No.: US 12,491,431 B2
(45) Date of Patent: Dec. 9, 2025

(54) GAME CONTROL METHOD AND APPARATUS, AND STORAGE MEDIUM

(71) Applicant: HUAWEI TECHNOLOGIES CO., LTD., Shenzhen (CN)

(72) Inventor: Chonghui Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 18/254,567

(22) PCT Filed: Nov. 23, 2021

(86) PCT No.: PCT/CN2021/132436
§ 371 (c)(1),
(2) Date: May 25, 2023

(87) PCT Pub. No.: WO2022/111472
PCT Pub. Date: Jun. 2, 2022

(65) Prior Publication Data
US 2024/0100415 A1    Mar. 28, 2024

(30) Foreign Application Priority Data
Nov. 25, 2020  (CN) .......................... 202011337487.4

(51) Int. Cl.
*A63F 13/22* (2014.01)
*A63F 13/2145* (2014.01)
(Continued)

(52) U.S. Cl.
CPC .......... *A63F 13/22* (2014.09); *A63F 13/2145* (2014.09); *A63F 13/42* (2014.09);
(Continued)

(58) Field of Classification Search
CPC .................................................... A63F 13/2145
See application file for complete search history.

(56) References Cited

U.S. PATENT DOCUMENTS 12,131,090 B1 * 10/2024 Anderson ................. G06F 3/14
2011/0086631 A1 * 4/2011 Park ................. H04N 21/42203
704/270

(Continued)

FOREIGN PATENT DOCUMENTS

| CN | 103312871 A | 9/2013 |
| CN | 104991734 A | 10/2015 |

(Continued)

*Primary Examiner* — Jay Trent Liddle
(74) *Attorney, Agent, or Firm* — Leydig, Voit & Mayer, Ltd.

(57) ABSTRACT

A game control method and apparatus are provided. The method includes: receiving mirror data sent by a game running device, wherein the mirror data indicates a current first game interface of the game running device; displaying a second game interface based on the mirror data, wherein there is a mapping relationship between the second game interface and the first game interface; and sending, when a touch event acting on the second game interface is obtained, a touch parameter corresponding to the touch event to the game running device, wherein the touch parameter indicates the game running device to respond to or skip responding to the touch event.

14 Claims, 6 Drawing Sheets

(51) Int. Cl.
    *A63F 13/42*     (2014.01)
    *A63F 13/92*     (2014.01)
    *G06F 3/04817*     (2022.01)
    *G06F 3/0486*     (2013.01)

(52) U.S. Cl.
    CPC .......... *A63F 13/92* (2014.09); *G06F 3/04817* (2013.01); *G06F 3/0486* (2013.01); *A63F 2300/308* (2013.01)

(56) References Cited

U.S. PATENT DOCUMENTS

| | | | | |
|---|---|---|---|---|
| 2012/0079080 | A1* | 3/2012 | Pishevar | A63F 13/332 |
| | | | | 709/220 |
| 2012/0249443 | A1* | 10/2012 | Anderson | A63F 13/213 |
| | | | | 345/173 |
| 2014/0179423 | A1* | 6/2014 | Deng | A63F 13/235 |
| | | | | 463/31 |
| 2014/0337769 | A1* | 11/2014 | Kim | G08C 17/00 |
| | | | | 715/761 |
| 2014/0380032 | A1 | 12/2014 | Takahashi et al. | |
| 2015/0011318 | A1* | 1/2015 | Takahashi | A63F 13/26 |
| | | | | 463/37 |
| 2015/0379476 | A1 | 12/2015 | Chaudhri et al. | |
| 2016/0044361 | A1* | 2/2016 | Delpuch | H04N 21/4126 |
| | | | | 725/133 |

FOREIGN PATENT DOCUMENTS

| | | |
|---|---|---|
| CN | 105872664 A | 8/2016 |
| CN | 106293713 A | 1/2017 |
| CN | 107694089 A | 2/2018 |
| CN | 108040273 A | 5/2018 |
| CN | 110354497 A | 10/2019 |
| CN | 110898426 A | 3/2020 |

* cited by examiner

GAME CONTROL METHOD AND APPARATUS, AND STORAGE MEDIUM

This application is a national stage of International Application No. PCT/CN2021/132436, filed on Nov. 23, 2021, which claims priority to Chinese Patent Application No. 202011337487.4 filed on Nov. 25, 2020. Both of the aforementioned applications are hereby incorporated by reference in their entireties.

TECHNICAL FIELD

Embodiments of this application relate to the field of human-computer interaction technologies, and in particular, to a game control method and apparatus, and a storage medium.

BACKGROUND

A handle peripheral is a common input apparatus for an electronic game. A user controls an electronic game in a game running device (for example, a television) by operating a button on a handle peripheral. However, due to a difference between electronic games, there may be a problem of incompatibility of handle peripherals. Therefore, a general-purpose handle peripheral configuration or a method that does not require a handle peripheral is required for game control.

In a related technology, there is a game assistance application that is applied to a mobile terminal and that provides a game assistance control function. After establishing a connection to a game running device, the mobile terminal obtains a game identifier of a game application currently running in the game running device, and displays a game control interface corresponding to the game identifier. When a trigger signal acting on a control of the game control interface is obtained, a corresponding control instruction is determined. For example, the control instruction instructs to control a virtual object to move rightwards. The mobile terminal sends the control instruction to the game running device, and the game running device controls the virtual object to perform an action corresponding to the control instruction.

In the foregoing method, the game control interface of the game application needs to be pre-configured in a customized manner. If the game application currently running does not adapt to the pre-configured game control interface, or the pre-configured game control interface is not updated in time after the game application is upgraded, a game control failure is caused.

SUMMARY

In view of this, a game control method and apparatus, and a storage medium are provided. Embodiments of this application provide a game control method that is based on a reverse projection control technology. When a current first game interface of a game running device is projected to a mobile terminal, the mobile terminal can control a game in the game running device through a mirror control capability.

According to a first aspect, an embodiment of this application provides a game control method. The method is applied to a mobile terminal and includes:

receiving mirror data sent by a game running device, where the mirror data indicates a current first game interface of the game running device;

displaying a second game interface based on the mirror data, where there is a mapping relationship between the second game interface and the first game interface; and sending, when a touch event acting on the second game interface is obtained, a touch parameter corresponding to the touch event to the game running device, where the touch parameter indicates the game running device to respond to or skip responding to the touch event.

In this implementation, the mobile terminal displays the second game interface based on the received mirror data of the current first game interface of the game running device, where there is a mapping relationship between the second game interface and the first game interface. When the touch event acting on the second game interface is obtained, the touch parameter corresponding to the touch event is sent to the game running device, so that the game running device responds to or skips responding to the touch event. To be specific, when the current first game interface of the game running device is projected to the mobile terminal, the mobile terminal can control a game in the game running device through a mirror control capability. This avoids a game control failure that may be caused by pre-configuring a game control interface in a related technology, and ensures a better human-computer interaction effect.

With reference to the first aspect, in a first possible implementation of the first aspect, the sending, when a touch event acting on the second game interface is obtained, a touch parameter corresponding to the touch event to the game running device includes:

obtaining the touch event acting on the second game interface, where the touch event indicates a touch action and second location information of the touch action in the second game interface;

determining, based on the mapping relationship, first location information that is in the first game interface and that corresponds to the second location information; and sending the touch parameter to the game running device, where the touch parameter includes the touch action and the first location information of the touch action.

In this implementation, the mobile terminal obtains the touch event acting on the second game interface; determines, based on the mapping relationship, the first location information that is in the first game interface and that corresponds to the second location information indicated by the touch event; and sends the touch parameter including the touch action and the first location information of the touch action to the game running device. This control method can avoid a problem of whether the game adapts to a game control handle. The mobile terminal can control the game only by transferring the location information and the touch action, to improve generality of game control.

With reference to the first aspect, in a second possible implementation of the first aspect, after the sending, when a touch event acting on the second game interface is obtained, a touch parameter corresponding to the touch event to the game running device, the method further includes:

generating a control panel when a quantity of obtained touch events reaches a first preset threshold, where the control panel indicates a hotspot location, and the hotspot location is a location at which the quantity of the corresponding touch events is greater than a second preset threshold.

In this implementation, a new method for generating a game control panel is provided based on the reverse projection control technology. To be specific, the mobile terminal actively collects the touch event, and automatically generates the control panel through the hotspot location, without the need to customize control panels of various games, to further improve generality of game control. In addition, an upgraded game can be controlled without the need to modify or upgrade an application version. This reduces function unavailability due to a difference caused by a game version upgrade.

With reference to the first aspect, in a third possible implementation of the first aspect, after the displaying a second game interface based on the mirror data, the method further includes:
  switching, when an enabling instruction of a panel training mode is obtained, the second game interface to a data collection interface for display;
  obtaining at least one touch event acting on the data collection interface and a second location corresponding to the at least one touch event; and
  generating a control panel based on the at least one touch event and the second location corresponding to the at least one touch event when an end instruction of the panel training mode is obtained.

In this implementation, a new method for generating a game control panel is provided based on the reverse projection control technology. To be specific, the mobile terminal generates, in the panel training mode, the control panel based on the at least one touch event and the second location corresponding to the at least one touch event, to implement customized configuration of the control panel and further improve flexibility of game control.

With reference to the second or the third possible implementation of the first aspect, in a fourth possible implementation of the first aspect, the method further includes:
  switching, after the control panel is generated, a current user interface to the control panel for display; or
  displaying a switching entrance of the control panel on the current user interface, and when a trigger instruction acting on the switching entrance is obtained, switching the current user interface to the control panel for display.

In this implementation, after generating the control panel, the mobile terminal switches, directly or based on the preset trigger instruction, the current user interface to the control panel for display, and stops a recording and forwarding capability of the game running device, to reduce a probability of game freezing and/or frame loss, and further ensure a better human-computer interaction effect.

With reference to the first aspect, in a fifth possible implementation of the first aspect, the method further includes:
  displaying, on the control panel, a function icon and/or a background image configured in a customized manner;
  dragging and displaying, when a drag instruction acting on the function icon is obtained, the function icon to a specified location on the control panel based on the drag instruction; and/or
  displaying a panel background of the control panel as the background image when a trigger instruction acting on the background image is obtained.

In this implementation, the mobile terminal displays, on the control panel, the function icon and/or the background image configured in the customized manner, and based on the preset instruction, the mobile terminal may drag and display the function icon to the specified location on the control panel or display the panel background of the control panel as the background image, to implement customized configuration of the control panel, and further improve flexibility of game control.

According to a second aspect, an embodiment of this application provides a game control method. The method is applied to a game running device and includes:
  sending mirror data to a mobile terminal, where the mirror data indicates a current first game interface of the game running device; and
  responding to or skipping responding to, based on a received touch parameter that corresponds to a touch event and that is sent by the mobile terminal, the touch event.

With reference to the second aspect, in a first possible implementation of the second aspect, the touch parameter includes a touch action and first location information of the touch action in the first game interface.

According to a third aspect, an embodiment of this application provides a game control apparatus. The game control apparatus includes at least one unit, and the at least one unit is configured to implement the game control method according to the first aspect or any one of the possible implementations of the first aspect.

According to a fourth aspect, an embodiment of this application provides a game control apparatus. The game control apparatus includes at least one unit, and the at least one unit is configured to implement the game control method according to the second aspect or any one of the possible implementations of the second aspect.

According to a fifth aspect, an embodiment of this application provides a game control apparatus. The apparatus includes: a processor; and a memory, configured to store instructions that can be executed by the processor. The processor is configured to implement the game control method according to the first aspect or any one of the possible implementations of the first aspect when executing the instructions.

According to a sixth aspect, an embodiment of this application provides a game control apparatus. The apparatus includes: a processor; and a memory, configured to store instructions that can be executed by the processor. The processor is configured to implement the game control method according to the second aspect or any one of the possible implementations of the second aspect when executing the instructions.

According to a seventh aspect, an embodiment of this application provides a computer program product, including computer-readable code or a non-volatile computer-readable storage medium carrying computer-readable code. When the computer-readable code runs in an electronic device, a processor in the electronic device performs the game control method according to the first aspect or any one of the possible implementations of the first aspect.

According to an eighth aspect, an embodiment of this application provides a computer program product, including computer-readable code or a non-volatile computer-readable storage medium carrying computer-readable code. When the computer-readable code runs in an electronic device, a processor in the electronic device performs the game control method according to the second aspect or any one of the possible implementations of the second aspect.

According to a ninth aspect, an embodiment of this application provides a non-volatile computer-readable storage medium, storing computer program instructions. When the computer program instructions are executed by a processor, the game control method according to the first aspect or any one of the possible implementations of the first aspect is implemented.

According to a tenth aspect, an embodiment of this application provides a non-volatile computer-readable storage medium, storing computer program instructions. When the computer program instructions are executed by a processor, the game control method according to the second aspect or any one of the possible implementations of the second aspect is implemented.

BRIEF DESCRIPTION OF DRAWINGS

The accompanying drawings included in this specification and constituting a part of this specification and this specification jointly show example embodiments, features, and aspects of this application, and are intended to explain principles of this application.

DESCRIPTION OF EMBODIMENTS

The following describes various example embodiments, features, and aspects of this application in detail with reference to the accompanying drawings. Identical reference signs in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment or illustration". Any embodiment described as "exemplary" is not necessarily explained as being superior or better than other embodiments.

In addition, to better describe this application, numerous specific details are given in the following specific implementations. A person skilled in the art should understand that this application can also be implemented without some specific details. In some embodiments, methods, means, elements and circuits that are well-known to a person skilled in the art are not described in detail, so that the subject matter of this application is highlighted.

Figure 1:
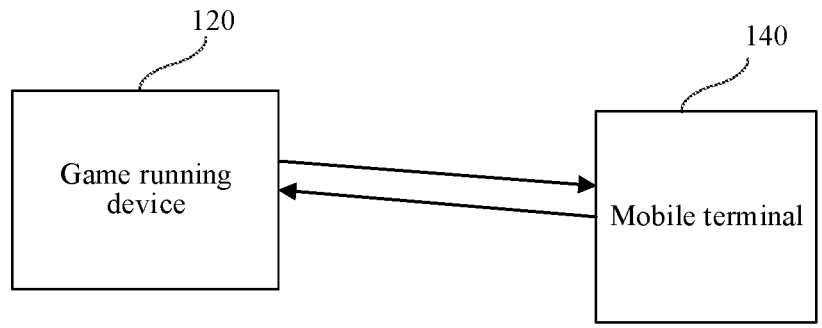
FIG. 1 is a schematic diagram of a structure of a game control system according to an embodiment of this application.

FIG. 1 is a schematic diagram of a structure of a game control system according to an embodiment of this application. The game control system includes a game running device 120 and a mobile terminal 140.

The game running device 120 is also referred to as a home media playback device, and the game running device 120 is an electronic device that can run a game application, for example, a smart television, a television box, or a projector. The game application may be a game application that needs to be downloaded and installed, or may be a click-to-run game application. This is not limited in embodiments of this application.

A communication connection may be established between the game running device 120 and the mobile terminal 140. The communication connection may be a wired network or a wireless network.

A game assistance application is installed in the mobile terminal 140, and the mobile terminal 140 is configured to establish a connection to the game running device 120 through the game assistance application and perform data exchange. The game assistance application is an application with a game assistance control function.

The mobile terminal 140 has a touchscreen, and the mobile terminal 140 is configured to collect a touch signal on the touchscreen. For example, the mobile terminal 140 is a mobile phone.

The following describe a game control method provided in embodiments of this application by using several example embodiments.

Figure 2:
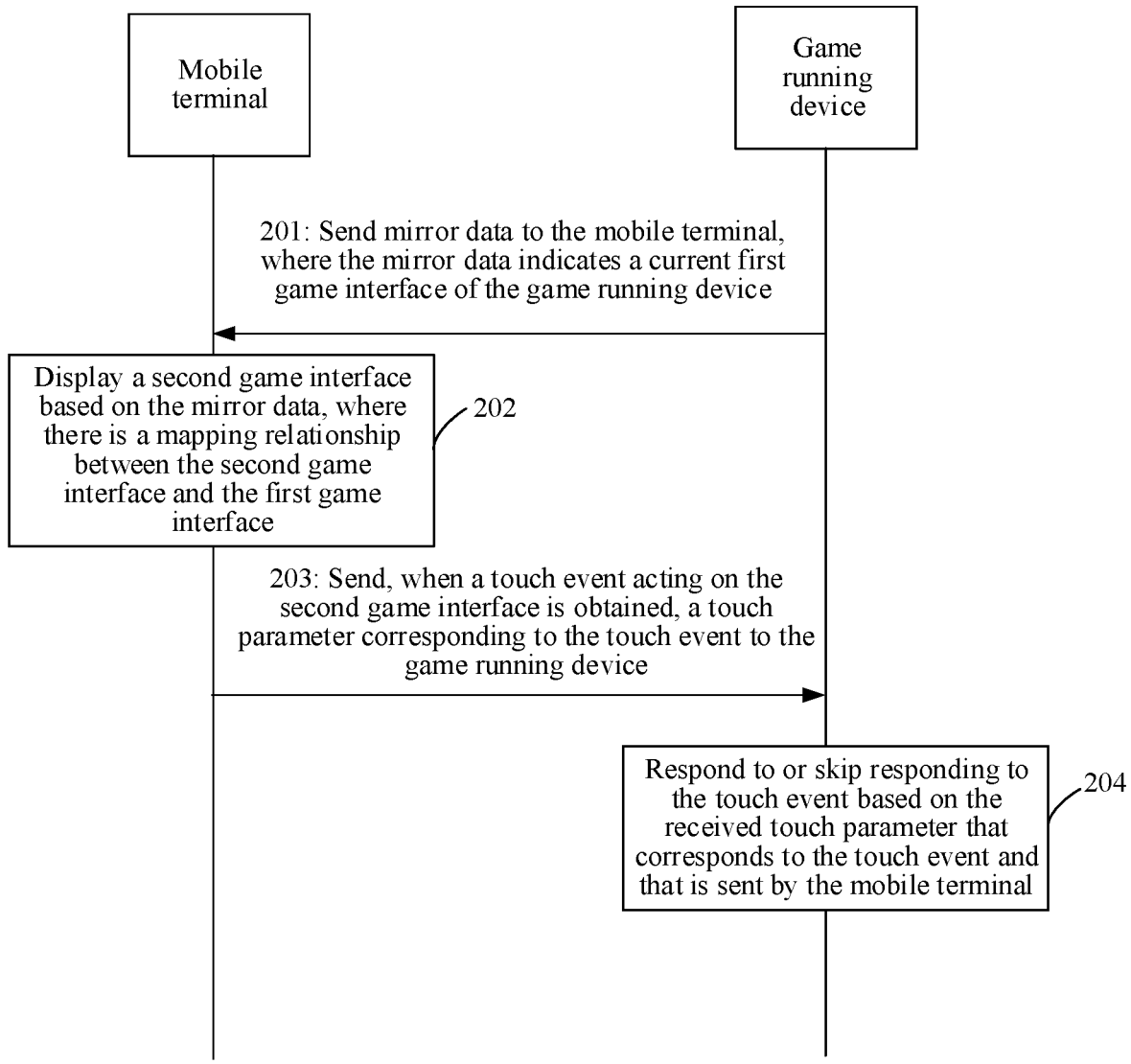
FIG. 2 is a flowchart of a game control method according to an example embodiment of this application.

FIG. 2 is a flowchart of a game control method according to an example embodiment of this application. The method is applied to the game control system shown in FIG. 1. The method includes but is not limited to the following steps.

Step 201: A game running device sends mirror data to a mobile terminal, where the mirror data indicates a current first game interface of the game running device.

The game running device displays the first game interface of a game application, and sends the mirror data of the first game interface to the mobile terminal. The first game interface is a game interface displayed in the game application currently running on the game running device.

Optionally, after receiving a mirror channel establishment request from the mobile terminal or after starting the game application and displaying the first game interface, the game running device obtains the mirror data of the current first game interface, and sends the mirror data to the mobile terminal. The mirror data indicates the current first game interface of the game running device.

Optionally, the game running device sends the mirror data of the current first game interface to the mobile terminal in real time, or at a preset time interval, or when the first game interface is switched.

The preset time interval is set by default or is set by a user. This is not limited in embodiments of this application.

Step 202: The mobile terminal displays a second game interface based on the mirror data, where there is a mapping relationship between the second game interface and the first game interface.

The mobile terminal receives the mirror data of the first game interface sent by the game running device, and displays the second game interface in a game assistance application based on the mirror data. The second game interface is a second game interface that has a mapping relationship with the first game interface and that is displayed in the game assistance application of the mobile terminal.

There is a mapping relationship between the second game interface and the first game interface. To be specific, display content on the second game interface is the same as and synchronized with display content on the first game interface. The mapping relationship includes a correspondence between location information corresponding to a plurality of functional controls in the first game interface and location information corresponding to a plurality of functional controls in the second game interface.

The functional control is an operable control. Optionally, a type of the functional control includes at least one of a button, a controllable item, and a sliding block. Optionally, the location information is a relative coordinate location.

Step 203: The mobile terminal sends, when a touch event acting on the second game interface is obtained, a touch parameter corresponding to the touch event to the game running device.

The mobile terminal sends the touch parameter corresponding to the touch event to the game running device after obtaining the touch event acting on the second game interface of the game assistance application. The sending is also referred to as transparent transmission.

The touch parameter indicates the game running device to respond to or skip responding to the touch event.

Optionally, the touch event indicates a touch action and second location information of the touch action in the second game interface. The touch parameter corresponding to the touch event includes the touch action and first location information of the touch action in the first game interface.

Optionally, a plurality of functional controls are displayed on the second game interface. It should be noted that, the mobile terminal does not need to learn of function information corresponding to the plurality of functional controls, and only needs to transfer the touch parameter (for example, the touch action and the first location information of the touch action in the first game interface) corresponding to the touch event to implement game control.

Step 204: The game running device responds to or skips responding to the touch event based on the received touch parameter that corresponds to the touch event and that is sent by the mobile terminal.

The game running device receives the touch parameter corresponding to the touch event sent by the mobile terminal, and responds to or skips responding to the touch event based on the touch parameter.

Optionally, the touch parameter corresponding to the touch event includes the touch action and the first location information of the touch action in the first game interface. The game running device searches for a control instruction corresponding to the touch action and the first location information based on a preset correspondence. The control instruction is for controlling a virtual object to perform a corresponding action. The preset correspondence includes a correspondence between the control instruction and both the touch action and the first location information.

When the game running device finds the control instruction corresponding to the touch action and the first location information, it indicates that the touch event is valid, and the game running device responds to the touch event to control the virtual object to perform the corresponding action. When the game running device does not find the control instruction corresponding to the touch action and the first location information, it indicates that the touch event is invalid, and the game running device skips responding to the touch event.

The virtual object is an object in the current first game interface of the game running device. For example, the virtual object is a virtual character or a virtual item. This is not limited in embodiments of this application.

To sum up, in embodiments of this application, the mobile terminal displays the second game interface based on the received mirror data of the current first game interface of the game running device, where there is a mapping relationship between the second game interface and the first game interface. When the touch event acting on the second game interface is obtained, the touch parameter corresponding to the touch event is sent to the game running device, so that the game running device responds to or skips responding to the touch event. To be specific, when the current first game interface of the game running device is projected to the mobile terminal, the mobile terminal can control a game in the game running device through a mirror control capability. This avoids a game control failure that may be caused by pre-configuring a game control interface in a related technology, and ensures a better human-computer interaction effect.

Figure 3:
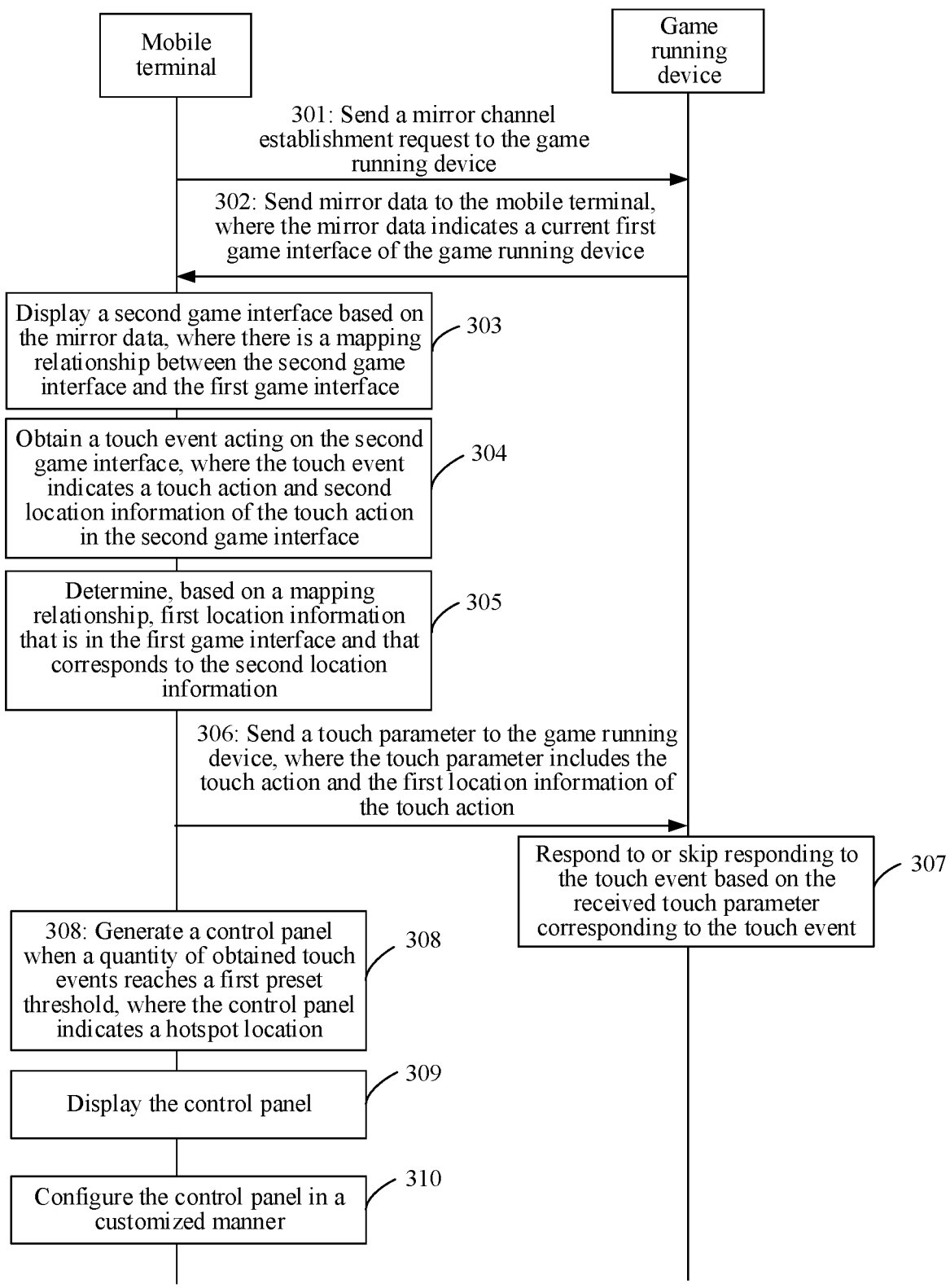
FIG. 3 is a flowchart of a game control method according to another example embodiment of this application.

FIG. 3 is a flowchart of a game control method according to another example embodiment of this application. The method is applied to the game control system shown in FIG. 1. The method includes but is not limited to the following steps.

Step 301: A mobile terminal sends a mirror channel establishment request to a game running device.

When a game assistance application of the mobile terminal runs in a foreground, the mirror channel establishment request is sent to the game running device through the game assistance application. The mirror channel establishment request is for requesting to establish a mirror channel between the mobile terminal and the game running device. The mirror channel is for transmitting mirror data sent by the game running device.

Step 302: The game running device sends the mirror data to the mobile terminal, where the mirror data indicates a current first game interface of the game running device.

The game running device receives the mirror channel establishment request, establishes the mirror channel with the mobile terminal, and sends the mirror data of the first game interface to the mobile terminal through the mirror channel.

Optionally, the game running device sends the mirror data of the current first game interface to the mobile terminal in real time.

It should be noted that, for a process in which the game running device sends the mirror data to the mobile terminal, refer to related details in the foregoing embodiment. Details are not described herein again.

Step 303: The mobile terminal displays a second game interface based on the mirror data, where there is a mapping relationship between the second game interface and the first game interface.

The mobile terminal receives, through the game assistance application, the mirror data of the first game interface sent by the game running device, and displays, in the game assistance application based on the mirror data, the second game interface that has a mapping relationship with the first game interface.

It should be noted that, for a process in which the mobile terminal displays the second game interface based on the mirror data, refer to related details in the foregoing embodiment. Details are not described herein again.

Step 304: The mobile terminal obtains a touch event acting on the second game interface, where the touch event indicates a touch action and second location information of the touch action in the second game interface.

The mobile terminal obtains the touch event acting on the second game interface of the game assistance application. The touch event indicates the touch action and the second location information of the touch action in the second game interface.

The touch action is an action corresponding to a user operation signal. For example, the touch action includes any one or a combination of tapping, sliding, pressing, and long-pressing.

Step 305: The mobile terminal determines, based on the mapping relationship, first location information that is in the first game interface and that corresponds to the second location information.

The mobile terminal stores the mapping relationship between the first game interface and the second game interface. The mapping relationship includes a correspondence between location information corresponding to a plurality of functional controls in the first game interface and location information corresponding to a plurality of functional controls in the second game interface.

The mobile terminal determines, based on the mapping relationship, the first location information that is in the first game interface and that corresponds to the second location information.

Step 306: The mobile terminal sends a touch parameter to the game running device, where the touch parameter includes the touch action and the first location information of the touch action.

The mobile terminal sends the touch parameter to the game running device through the game assistance application, where the touch parameter includes the touch action and the first location information of the touch action.

Step 307: The game running device responds to or skips responding to the touch event based on the received touch parameter corresponding to the touch event.

The game running device responds to or skips responding to the touch event based on the received touch action corresponding to the touch event and the first location information of the touch action in the first game interface.

It should be noted that, for a process in which the game running device responds to or skips responding to the touch event based on the received touch parameter corresponding to the touch event, refer to related details in the foregoing embodiment. Details are not described herein again.

Step 308: Generate a control panel when a quantity of touch events obtained by the mobile terminal reaches a first preset threshold, where the control panel indicates a hotspot location.

The control panel indicates one or more hotspot locations, and the hotspot location is a location at which the quantity of the corresponding touch events is greater than a second preset threshold.

Optionally, the control panel includes a functional control at at least one hotspot location. The functional control is an operable control. For example, a type of the functional control includes at least one of a button, a controllable item, and a sliding block.

The mobile terminal actively collects touch events when controlling a game in a mirror control manner. When the quantity of obtained touch events reaches the first preset threshold, the mobile terminal analyzes the plurality of touch events, generates a mapping table between a hotspot location and a touch action, generates a control panel configuration file based on the mapping table, and generates the control panel based on the control panel configuration file. The hotspot location is a location at which the quantity of the corresponding touch events is greater than the second preset threshold.

The second preset threshold is less than the first preset threshold. The first preset threshold or the second preset threshold is set by default, or is set by a user. This is not limited in embodiments of this application.

Optionally, the control panel configuration file is an interface extensible markup language (XML) file of the control panel.

The control panel may be generated based on the foregoing hotspot location, or may be generated based on a user-defined setting. In a possible implementation, when an enabling instruction of a panel training mode is obtained, the mobile terminal switches the second game interface to a data collection interface for display; obtains at least one touch event acting on the data collection interface and a second location corresponding to the at least one touch event; and generates the control panel based on the at least one touch event and the second location corresponding to the at least one touch event when an end instruction of the panel training mode is obtained.

The control panel indicates the second location corresponding to the at least one touch event. Optionally, the control panel includes a functional control at the second location corresponding to the at least one touch event.

When the mobile terminal controls the game in the mirror control manner, when the enabling instruction of the panel training mode is obtained, the mobile terminal enables the panel training mode, and switches the second game interface to the data collection interface for display.

The enabling instruction may be a touch signal acting on a data collection start control of the second game interface. The enabling instruction may alternatively be implemented in a voice form. This is not limited in embodiments of this application.

Optionally, the data collection interface is an interface on which prompt information and a data collection end control are superimposed and displayed on the second game interface, where the prompt information indicates to start data collection.

Optionally, when the end instruction of the panel training mode is obtained, the mobile terminal generates the control panel configuration file based on the at least one touch event and the second location corresponding to the at least one touch event, and generates the control panel based on the control panel configuration file.

The end instruction may be a touch signal acting on the data collection end control on the data collection interface, or may be a touch signal acting on the data collection interface, or may be implemented in a voice form. This is not limited in embodiments of this application.

The foregoing functional control (for example, the data collection start control or the data collection end control) is an operable control. Optionally, a type of the functional control includes at least one of a button, a controllable item, and a sliding block.

Figure 4:
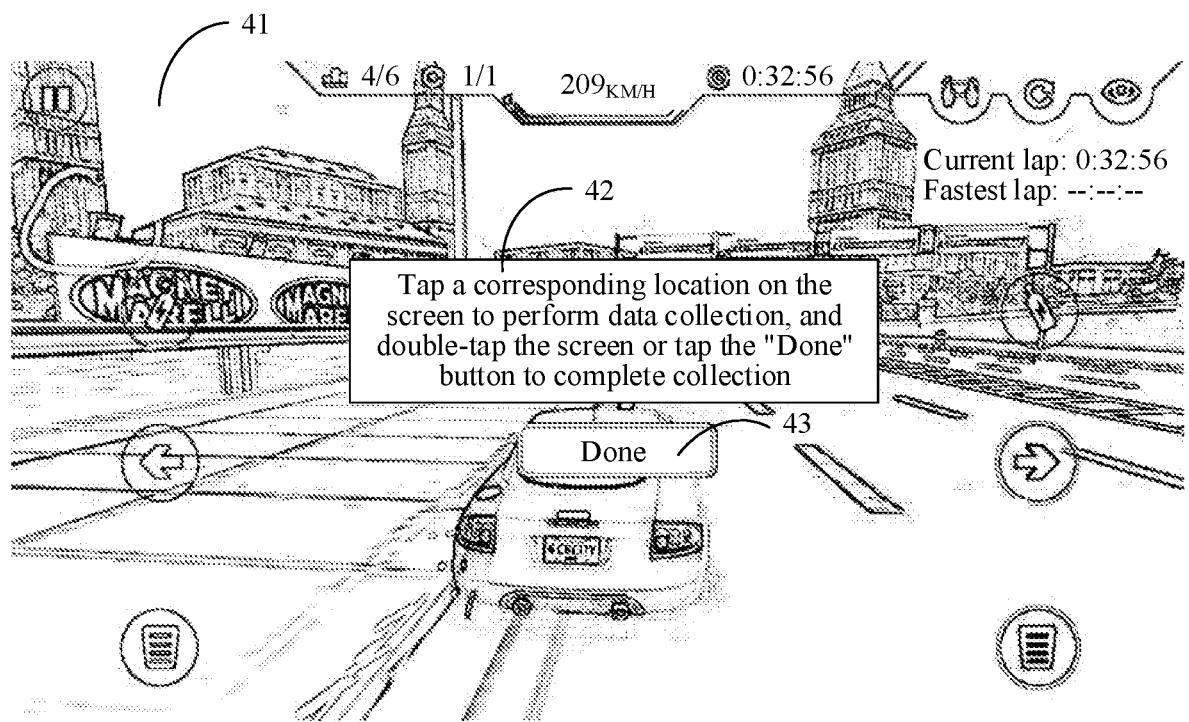
FIG. 4 is a schematic diagram of an interface of a game control method according to an example embodiment of this application.

In an example, as shown in FIG. 4, when an enabling instruction of a panel training mode is obtained, a mobile terminal enables the panel training mode, and switches a second game interface to a data collection interface 41. Prompt information 42 and a "Done" button 43 are displayed on the data collection interface 41. The prompt information 42 is as follows: tap a corresponding location on the screen to perform data collection, and double-tap the screen or tap the "Done" button to complete collection. The mobile terminal obtains at least one touch event acting on the data collection interface 41 and a second location corresponding to the at least one touch event. When a double-tap signal acting on the data collection interface 41 or a tap signal acting on the "Done" button 43 is obtained, the mobile terminal generates a control panel based on the at least one touch event and the second location corresponding to the at least one touch event.

Optionally, after generating the control panel, the mobile terminal switches the data collection interface back to the second game interface for display, and displays a switching entrance of the control panel on the second game interface. Alternatively, after generating the control panel, the mobile terminal directly switches the data collection interface to the control panel for display. Alternatively, after generating the control panel, the mobile terminal displays a switching entrance of the control panel and/or a switching entrance of the second game interface on the data collection interface. This is not limited in embodiments of this application.

Step 309: The mobile terminal displays the control panel.

Optionally, the mobile terminal displays the control panel through a game assistance application.

Optionally, after generating the control panel, the mobile terminal invokes the generated control panel, and stops a recording and forwarding capability of the game running device, to reduce a probability of game freezing and/or frame loss, and retaining a capability of transparently transmitting the touch parameter.

That the mobile terminal displays the control panel includes but is not limited to the following several possible implementations.

In a possible implementation, after generating the control panel, the mobile terminal switches the current user interface to the control panel for display.

To be specific, after generating the control panel, the mobile terminal directly switches the current user interface to the control panel for display, where the current user interface is the second game interface or the data collection interface.

In another possible implementation, the mobile terminal displays the switching entrance of the control panel on the current user interface, and when a trigger instruction acting on the switching entrance is obtained, switches the current user interface to the control panel for display.

Optionally, the mobile terminal displays the switching entrance of the control panel on the current user interface, and when the trigger instruction acting on the switching entrance is obtained, switches the current user interface to the control panel for display.

The trigger instruction acting on the switching entrance may be a touch signal acting on the switching entrance, or may be implemented in a voice form. This is not limited in embodiments of this application.

Figure 5:
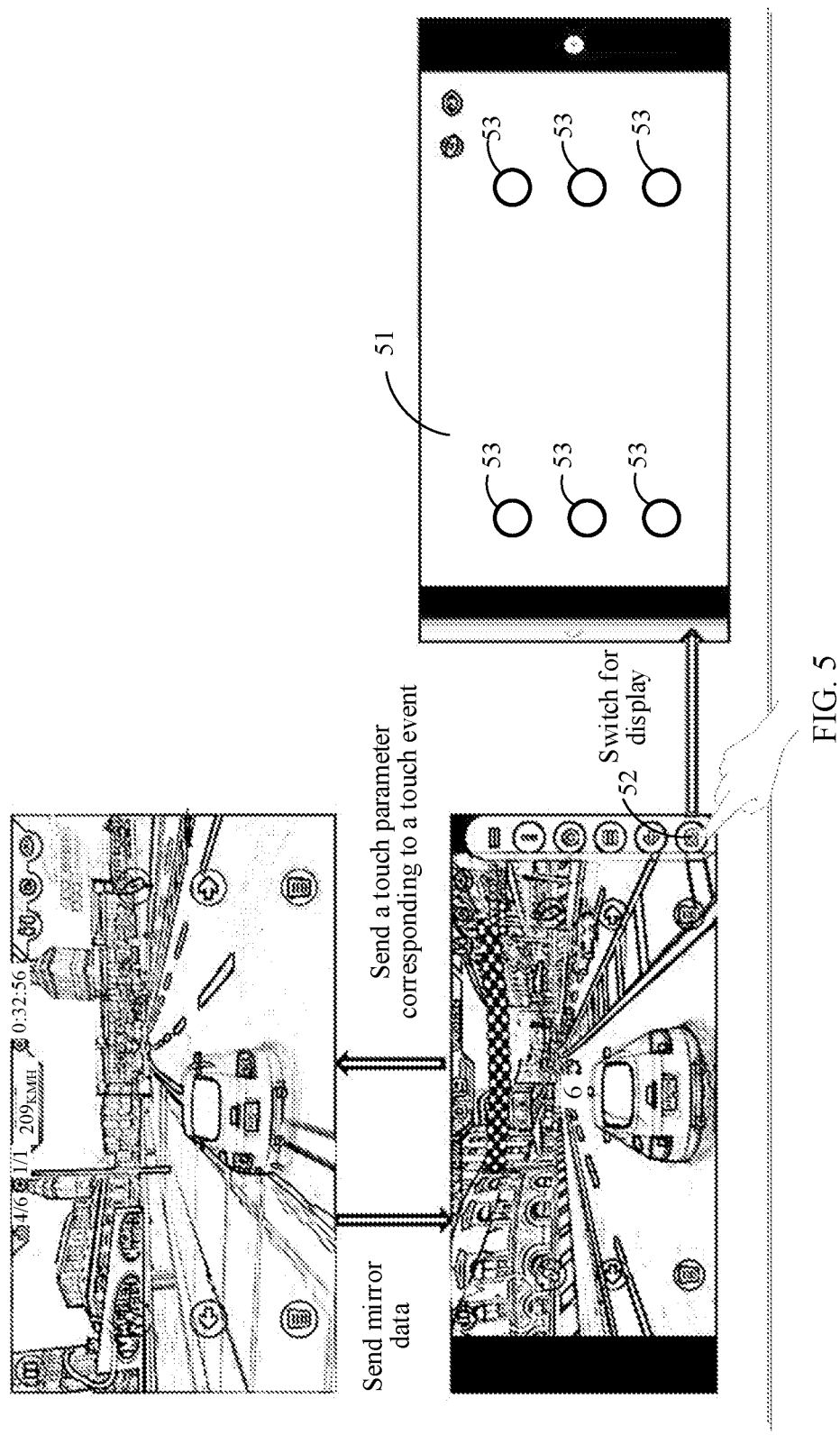
FIG. 5 is a schematic diagram of an interface of a game control method according to another example embodiment of this application.

In an example, as shown in FIG. 5, after sending a mirror channel establishment request to a game running device through a game assistance application, a mobile terminal receives mirror data of a first game interface sent by the game running device in real time, and synchronously displays a second game interface corresponding to the first game interface based on the mirror data. The mobile terminal actively collects, through the game assistance application, a touch event acting on the second game interface, and sends a touch parameter corresponding to the touch event to the game running device. When a quantity of touch events obtained by the mobile terminal reaches a first preset threshold, a control panel configuration file of the control panel 51 is generated, and a switching entrance 52 is displayed on a sidebar of the second game interface. When a tap signal acting on the switching entrance 52 is obtained, the second game interface is switched, based on the control panel configuration file, to the control panel 51 for display, where the control panel 51 includes functional controls 53 at a plurality of hotspot locations.

Step 310: The mobile terminal configures the control panel in a customized manner.

Optionally, the mobile terminal displays, on the control panel, a function icon and/or a background image configured in a customized manner; drags and displays, when a drag instruction acting on the function icon is obtained, the function icon to a specified location on the control panel based on the drag instruction; and/or displays a panel background of the control panel as the background image when a trigger instruction acting on the background image is obtained.

Optionally, when a configuration trigger instruction acting on the control panel is obtained, the mobile terminal displays a sidebar on the control panel, and displays a parameter configured in a customized manner on the sidebar, where the parameter configured in a customized manner includes at least one function icon and/or at least one background image.

Optionally, the function icon indicates to customize a type, a location, and a style of the functional control on the control panel.

The configuration trigger instruction may be a touch signal acting on a control configured in a customized manner on the control panel, or may be a preset sliding signal, or may be implemented in a voice form. This is not limited in embodiments of this application.

The trigger instruction acting on the background image may be a touch signal acting on the background image, or may be implemented in a voice form. This is not limited in embodiments of this application.

Figure 6:
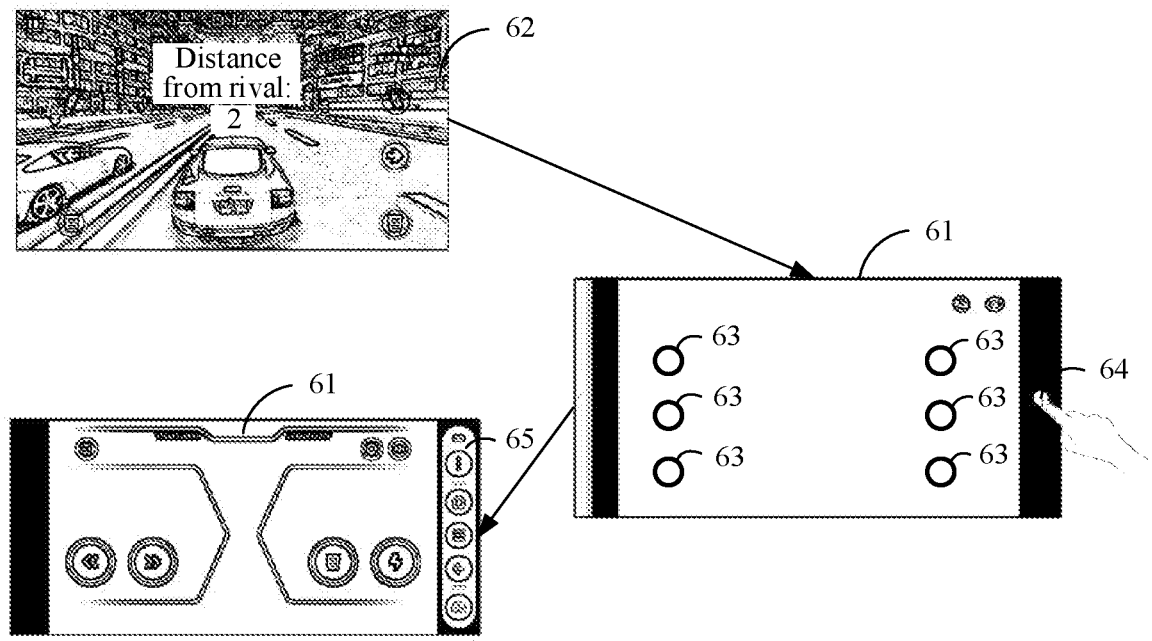
FIG. 6 is a schematic diagram of an interface of a game control method according to another example embodiment of this application.

In an example, as shown in FIG. 6, after generating a control panel 61, a mobile terminal switches a second game interface 62 to the control panel 61 for display, where the control panel 61 includes functional controls 63 at a plurality of hotspot locations and a control 64 configured in a customized manner. When a tap signal acting on the control 64 configured in a customized manner on the control panel 61 is obtained, a sidebar 65 is displayed on the control panel 61, where a parameter configured in a customized manner is displayed on the sidebar 65. The parameter configured in a customized manner includes at least one function icon and/or at least one background image. The control panel 61 is configured in a customized manner based on a touch signal corresponding to at least one parameter configured in a customized manner.

To sum up, according to the game control method provided in embodiments of this application, in one aspect, when the second game interface of the game running device is projected to the mobile terminal, the mobile terminal can control the game in the game running device through the mirror control capability. This control method can avoid a problem of whether the game adapts to a game control handle. The mobile terminal can control the game only by transferring the location information and the touch action, to improve generality of game control. In another aspect, a new method for generating a game control panel is provided based on the reverse projection control technology. To be specific, the mobile terminal actively collects the touch event on the game assistance application, and automatically generates the control panel through the hotspot location, without the need to customize control panels of various games, to improve generality of game control. In addition, an upgraded game can be controlled without the need to modify or upgrade an application version of the game assistance application. This reduces function unavailability due to a difference caused by a game version upgrade.

Figure 7:
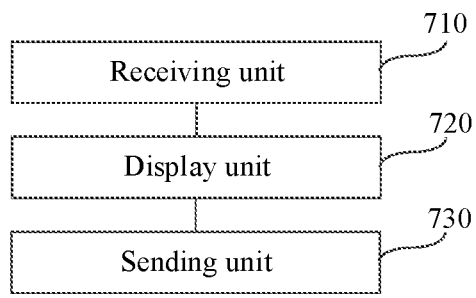
FIG. 7 is a block diagram of a game control apparatus according to an example embodiment of this application.

FIG. 7 is a block diagram of a game control apparatus according to an example embodiment of this application. The game control apparatus may be implemented as a whole or a part of the mobile terminal shown in FIG. 1 through software, hardware, or a combination thereof. The game control apparatus may include a receiving unit 710, a display unit 720, and a sending unit 730.

The receiving unit 710 is configured to receive mirror data sent by a game running device, where the mirror data indicates a current first game interface of the game running device.

The display unit 720 is configured to display a second game interface based on the mirror data, where there is a mapping relationship between the second game interface and the first game interface.

The sending unit 730 is configured to send, when a touch event acting on the second game interface is obtained, a touch parameter corresponding to the touch event to the game running device, where the touch parameter indicates the game running device to respond to or skip responding to the touch event.

In a possible implementation, the sending unit 730 is further configured to:
  obtain the touch event acting on the second game interface, where the touch event indicates a touch action and second location information of the touch action in the second game interface;
  determine, based on the mapping relationship, first location information that is in the first game interface and that corresponds to the second location information; and
  send the touch parameter to the game running device, where the touch parameter includes the touch action and the first location information of the touch action.

In another possible implementation, the apparatus further includes a first generation unit, where the first generation unit is configured to:
  generate a control panel when a quantity of obtained touch events reaches a first preset threshold, where the control panel indicates a hotspot location, and the hotspot location is a location at which the quantity of the corresponding touch events is greater than a second preset threshold.

In another possible implementation, the apparatus further includes a second generation unit, where the second generation unit is configured to:
  switch, when an enabling instruction of a panel training mode is obtained, the second game interface to a data collection interface for display;
  obtain at least one touch event acting on the data collection interface and a second location corresponding to the at least one touch event; and
  generate a control panel based on the at least one touch event and the second location corresponding to the at least one touch event when an end instruction of the panel training mode is obtained.

In another possible implementation, the apparatus further includes a display switching unit, where the display switching unit is configured to:
  switch, after the control panel is generated, a current user interface to the control panel for display; or
  display a switching entrance of the control panel on the current user interface, and when a trigger instruction acting on the switching entrance is obtained, switch the current user interface to the control panel for display.

In another possible implementation, the apparatus further includes a customized configuration unit, where the customized configuration unit is configured to:
  display, on the control panel, a function icon and/or a background image configured in a customized manner;
  drag and display, when a drag instruction acting on the function icon is obtained, the function icon to a specified location on the control panel based on the drag instruction; and/or
  display a panel background of the control panel as the background image when a trigger instruction acting on the background image is obtained.

It should be noted that, when the apparatus according to the foregoing embodiment implements functions of the apparatus, division into the foregoing functional modules is merely used as an example for description. In actual application, the foregoing functions may be allocated to different functional modules for implementation based on actual requirements. In other words, a content structure of a device is divided into different functional modules, to implement all or some of the functions described above.

For the apparatus in the foregoing embodiment, specific manners of executing operations by each module are described in detail in embodiments related to the method, and details are not described herein.

Figure 8:
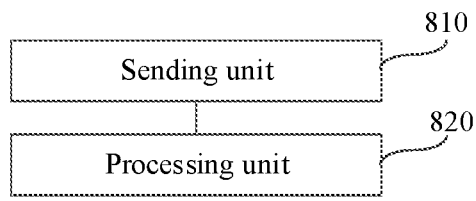
FIG. 8 is a block diagram of a game control apparatus according to another example embodiment of this application.

FIG. 8 is a block diagram of a game control apparatus according to another example embodiment of this application. The game control apparatus may be implemented as a whole or a part of the game running device shown in FIG. 1 through software, hardware, or a combination thereof. The game control apparatus may include a sending unit 810 and a processing unit 820.

The sending unit 810 is configured to send mirror data to a mobile terminal, where the mirror data indicates a current first game interface of a game running device.

The processing unit 820 is configured to respond to or skip responding to, based on a received touch parameter that corresponds to a touch event and that is sent by the mobile terminal, the touch event.

In a possible implementation, the touch parameter includes a touch action and first location information of the touch action in the first game interface.

It should be noted that, when the apparatus according to the foregoing embodiment implements functions of the apparatus, division into the foregoing functional modules is merely used as an example for description. In actual application, the foregoing functions may be allocated to different functional modules for implementation based on actual requirements. In other words, a content structure of a device is divided into different functional modules, to implement all or some of the functions described above.

For the apparatus in the foregoing embodiment, specific manners of executing operations by each module are described in detail in embodiments related to the method, and details are not described herein.

Figure 9:
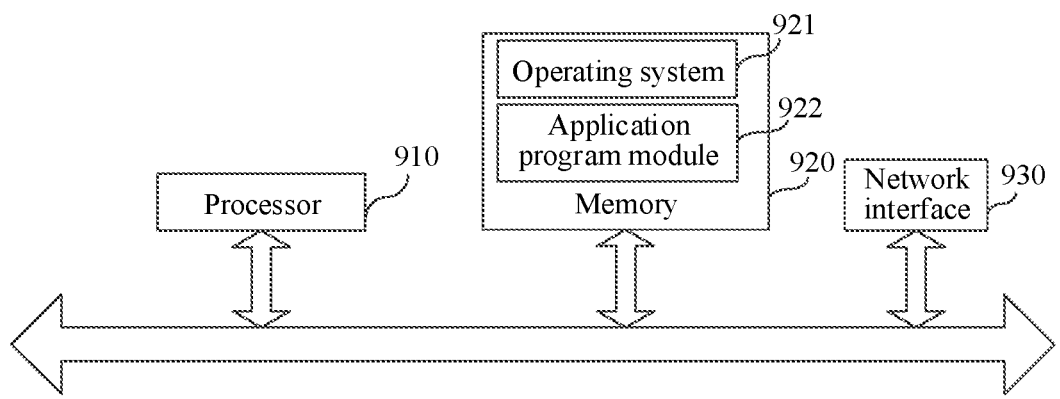
FIG. 9 is a schematic diagram of a structure of a mobile terminal according to an embodiment of this application.

FIG. 9 is a schematic diagram of a structure of a mobile terminal according to an embodiment of this application. The mobile terminal includes a central processing unit (CPU) 910, a memory 920, and a network interface 930.

The central processing unit 910 includes one or more processing cores. The central processing unit 910 is configured to execute various functional applications of the mobile terminal and is configured to perform data processing.

The mobile terminal generally includes a plurality of network interfaces 930.

The memory 920 is connected to the central processing unit 910 through a bus. The memory 920 is configured to store instructions, and the processor 910 executes the instructions stored in the memory 920 to implement the foregoing game control method performed by the mobile terminal.

The memory 920 can store an operating system 921 and an application program module 922 required for at least one function. The operating system 921 includes at least one of a Linux operating system, a Unix operating system, and a Windows operating system.

Optionally, the application program module 922 includes a receiving unit, a display unit, a sending unit, another unit configured to implement the foregoing game control method, and the like.

The receiving unit is configured to receive mirror data sent by a game running device, where the mirror data indicates a current first game interface of the game running device.

The display unit is configured to display a second game interface based on the mirror data, where there is a mapping relationship between the second game interface and the first game interface.

The sending unit is configured to send, when a touch event acting on the second game interface is obtained, a touch parameter corresponding to the touch event to the game running device, where the touch parameter indicates the game running device to respond to or skip responding to the touch event.

Optionally, the memory 920 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

Figure 10:
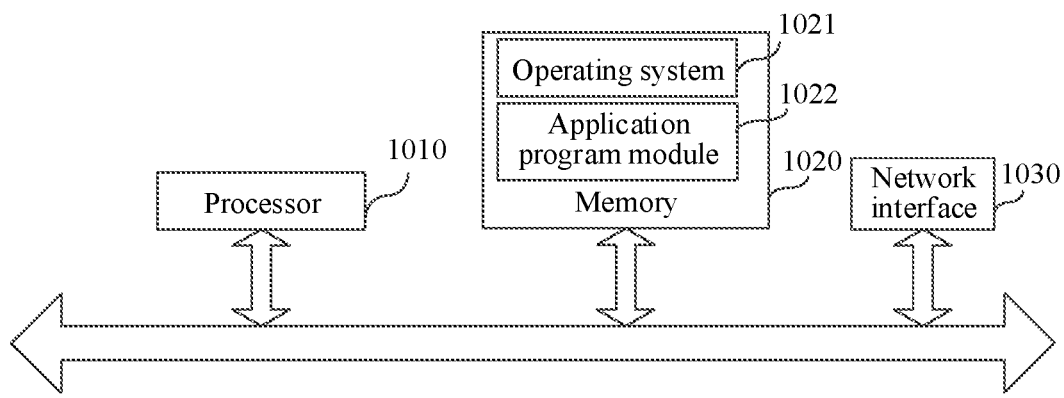
FIG. 10 is a schematic diagram of a structure of a game running device according to an embodiment of this application.

FIG. 10 is a schematic diagram of a structure of a game running device according to an embodiment of this application. The game running device includes a central processing unit 1010, a memory 1020, and a network interface 1030.

The central processing unit 1010 includes one or more processing cores. The central processing unit 1010 is configured to execute various functional applications of the game running device and is configured to perform data processing.

The game running device generally includes a plurality of network interfaces 1030.

The memory 1020 is connected to the central processing unit 1010 through a bus. The memory 1020 is configured to store instructions, and the processor 1010 executes the instructions stored in the memory 1020 to implement the foregoing game control method performed by the game running device.

The memory 1020 may store an operating system 1021 and an application program module 1022 required for at least one function. The operating system 1021 includes at least one of a Linux operating system, a Unix operating system, and a Windows operating system.

Optionally, the application program module 1022 includes a sending unit, a processing unit, another unit configured to implement the foregoing game control method, and the like.

The sending unit is configured to send mirror data to a mobile terminal, where the mirror data indicates a current first game interface of a game running device.

The processing unit is configured to respond to or skip responding to, based on a received touch parameter that corresponds to a touch event and that is sent by the mobile terminal, the touch event.

Optionally, the memory 1020 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

An embodiment of this application provides a mobile terminal. The mobile terminal includes: a processor; and a memory, configured to store instructions that can be executed by the processor. The processor is configured to implement the foregoing method performed by the mobile terminal side when executing the instructions.

An embodiment of this application provides a game running device. The game running device includes: a processor; and a memory, configured to store instructions that can be executed by the processor. The processor is configured to implement the foregoing method performed by the game running device side when executing the instructions.

An embodiment of this application provides a computer program product, including computer-readable code or a non-volatile computer-readable storage medium carrying computer-readable code. When the computer-readable code runs in a processor in an electronic device, the processor in the electronic device performs the foregoing method.

An embodiment of this application provides a non-volatile computer-readable storage medium, storing computer program instructions. When the computer program instructions are executed by a processor, the foregoing method is implemented.

The computer-readable storage medium may be a tangible device that maintains and stores instructions used by an instruction execution device. For example, the computer-readable storage medium includes but is not limited to an electrical storage device, a magnetic storage device, an optical storage device, an electromagnetic storage device, a semiconductor storage device, or any suitable combination of the foregoing devices. More specific examples (a non-exhaustive list) of computer-readable storage media include: a portable computer disk, a hard disk, a random access memory (RAM), a read-only memory (ROM), an erasable programmable read-only memory (Electrically Programmable Read-Only-Memory, EPROM) or a flash memory, a static random access memory (SRAM), a portable compact disk read-only memory (CD-ROM), a digital versatile disc (digital video disc, DVD), a memory stick, a floppy disk, a mechanical coding device, for example, a punched card or a groove protrusion structure that stores instructions, and any suitable combination thereof.

Computer-readable program instructions or code described herein may be downloaded to each computing/processing device from a computer-readable storage medium or to an external computer or an external storage device through a network, for example, the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions for performing the operations in this application may be assembly instructions, instruction set architecture ( ) instructions, machine instructions, machine-related instructions, microcode, firmware instructions, status setting data, or source code or object code written in any combination of one or more programming languages. The programming language includes object-oriented programming languages such as Smalltalk and C++, and conventional procedural programming languages such as a C language or a similar programming language. The computer-readable program instructions may be executed entirely on a user computer, partly on the user computer, as a stand-alone software package, partly on the user computer and partly on a remote computer, or entirely on the remote computer or a server. When a remote computer is used, the remote computer may be connected to a user computer through any type of network, including a local area network (LAN) or a wide area network (WAN), or may be connected to an external computer (for example, via the Internet through an Internet service provider). In some embodiments, an electronic circuit, for example, a programmable logic circuit, a field programmable gate array (FPGA), or a programmable logic array (PLA), is customized based on status information of the computer-readable program instructions. The electronic circuit can execute the computer-readable program instructions, to implement various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device so that a series of operation steps is performed on the computer, the another programmable data processing apparatus, or the another device to produce a computer-implemented process. Therefore, the instructions executed on the computer, the another programmable data processing apparatus, or the another device implements the functions/acts specified in the one or more blocks in the flowcharts and/or block diagrams.

The flowcharts and the block diagrams in the accompanying drawings show system architectures, functions, and operations possibly implemented in the apparatuses, the systems, the methods, and the computer program products according to the plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may, in practice, be executed substantially in parallel, and may sometimes be executed in a reverse order, depending on a function involved.

It should also be noted that each block in the block diagram and/or the flowchart, and a combination of blocks in the block diagram and/or the flowchart may be implemented by hardware (for example, a circuit or an ASIC (application-specific integrated circuit)) that performs a corresponding function or action, or may be implemented by a combination of hardware and software, for example, firmware.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Embodiments of this application are described above. The foregoing descriptions are exemplary, not exhaustive, and are not limited to the disclosed embodiments. Many modifications and changes are apparent to those of ordinary skill in the art without departing from the scope and spirit of the illustrated embodiments. The selection of terms used herein is intended to best explain the principles of embodiments, practical applications, or improvements to technologies in the market, or to enable another person of ordinary skill in the art to understand embodiments disclosed herein.

What is claimed is:

1. A game control method, applied to a mobile terminal, the method comprising:
 receiving mirror data sent by a game running device, wherein the mirror data indicates a current first game interface of the game running device;
 displaying a second game interface based on the mirror data, wherein there is a mapping relationship between the second game interface and the current first game interface; and
 sending, based on a touch event acting on the second game interface being obtained, a touch parameter corresponding to the touch event to the game running device, wherein the touch parameter indicates the game running device to respond to or skip responding to the touch event,
 wherein after sending the touch parameter corresponding to the touch event to the game running device, the method further comprises:
 generating a control panel based on a quantity of obtained touch events reaching a first preset threshold, wherein the control panel indicates a hotspot location, and the hotspot location is a location at which the quantity of the obtained touch events is greater than a second preset threshold.

2. The method according to claim 1, wherein the sending the touch parameter corresponding to the touch event to the game running device comprises:
   obtaining the touch event acting on the second game interface, wherein the touch event indicates a touch action and second location information of the touch action in the second game interface;
   determining, based on the mapping relationship, first location information that is in the current first game interface and that corresponds to the second location information; and
   sending the touch parameter to the game running device, wherein the touch parameter comprises the touch action and the first location information of the touch action.

3. The method according to claim 1, wherein after displaying the second game interface based on the mirror data, the method further comprises:
   switching, based on an enabling instruction of a panel training mode being obtained, the second game interface to a data collection interface for display;
   obtaining at least one touch event acting on the data collection interface and a second location corresponding to the at least one touch event; and
   generating a control panel, according to the at least one touch event and the second location corresponding to the at least one touch event, based on an end instruction of the panel training mode being obtained.

4. The method according to claim 1, further comprising:
   switching, after the control panel is generated, a current user interface to the control panel for display.

5. The method according to claim 1, further comprising:
   displaying, on a control panel, a function icon and/or a background image configured in a customized manner;
   dragging and displaying, based on a drag instruction acting on the function icon being obtained, the function icon to a specified location on the control panel based on the drag instruction; and/or
   displaying a panel background of the control panel as the background image based on a trigger instruction acting on the background image being obtained.

6. The method according to claim 1, further comprising:
   displaying a switching entrance of the control panel on a current user interface, and based on a trigger instruction acting on the switching entrance being obtained, switching the current user interface to the control panel for display.

7. A game control method, applied to a game running device, the method comprising:
   sending mirror data to a mobile terminal, wherein the mirror data indicates a current first game interface of the game running device; and
   responding to or skipping responding to a touch event, based on a received touch parameter that corresponds to the touch event and that is sent by the mobile terminal,
   wherein after the touch parameter corresponding to the touch event is sent by the mobile terminal, the method further comprises:
   generating, by the mobile terminal, a control panel based on a quantity of obtained touch events reaching a first preset threshold, wherein the control panel indicates a hotspot location, and the hotspot location is a location at which the quantity of the obtained touch events is greater than a second preset threshold.

8. The method according to claim 7, wherein the touch parameter comprises a touch action and first location information of the touch action in the first game interface.

9. A game control apparatus, comprising:
   a processor; and
   a memory, configured to store instructions that are executable by the processor, wherein the processor is configured to execute the stored instructions and implement a method including:
   receiving mirror data sent by a game running device, wherein the mirror data indicates a current first game interface of the game running device;
   displaying a second game interface based on the mirror data, wherein there is a mapping relationship between the second game interface and the current first game interface; and
   sending, based on a touch event acting on the second game interface being obtained, a touch parameter corresponding to the touch event to the game running device, wherein the touch parameter indicates the game running device to respond to or skip responding to the touch event,
   wherein after sending the touch parameter corresponding to the touch event to the game running device, the method further comprises:
   generating a control panel based on a quantity of obtained touch events reaching a first preset threshold, wherein the control panel indicates a hotspot location, and the hotspot location is a location at which the quantity of the obtained touch events is greater than a second preset threshold.

10. The game control apparatus to claim 9, wherein the sending the touch parameter corresponding to the touch event to the game running device comprises:
    obtaining the touch event acting on the second game interface, wherein the touch event indicates a touch action and second location information of the touch action in the second game interface;
    determining, based on the mapping relationship, first location information that is in the current first game interface and that corresponds to the second location information; and
    sending the touch parameter to the game running device, wherein the touch parameter comprises the touch action and the first location information of the touch action.

11. The game control apparatus to claim 9, wherein after displaying the second game interface based on the mirror data, the processor is configured to execute the stored instructions and implement:
    switching, based on an enabling instruction of a panel training mode being obtained, the second game interface to a data collection interface for display;
    obtaining at least one touch event acting on the data collection interface and a second location corresponding to the at least one touch event; and
    generating a control panel according to the at least one touch event and the second location corresponding to the at least one touch event based on an end instruction of the panel training mode being obtained.

12. The game control apparatus to claim 9, wherein the processor is configured to execute the stored instructions and implement:
    switching, after the control panel is generated, a current user interface to the control panel for display.

13. The game control apparatus to claim 9, wherein the processor is configured to execute the stored instructions and implement:
    displaying, on a control panel, a function icon and/or a background image configured in a customized manner;

dragging and displaying, based on a drag instruction acting on the function icon being obtained, the function icon to a specified location on the control panel based on the drag instruction; and/or displaying a panel background of the control panel as the background image based on a trigger instruction acting on the background image being obtained.

14. The game control apparatus to claim 9, wherein the processor is configured to execute the stored instructions and implement:

displaying a switching entrance of the control panel on a current user interface, and based on a trigger instruction acting on the switching entrance being obtained, switching the current user interface to the control panel for display.

* * * * *